United States Patent [19]

Gschwend

[11] 4,328,725
[45] May 11, 1982

[54] METHOD OF AND APPARATUS FOR AUTOMATICALLY DISCARDING THE FRONT AND REAR ENDS OF BARS OF MATERIAL

[75] Inventor: René Gschwend, Reinach, Switzerland

[73] Assignee: Hatebur Umformmaschinen, Reinach, Switzerland

[21] Appl. No.: 187,886

[22] Filed: Sep. 17, 1980

[30] Foreign Application Priority Data

Oct. 5, 1979 [DE] Fed. Rep. of Germany ....... 2940375

[51] Int. Cl.³ .................... B23D 15/00; B26D 5/32
[52] U.S. Cl. ................................. 83/27; 83/39; 83/71; 83/80; 83/211; 83/364
[58] Field of Search ............... 83/27, 39, 13, 21, 80, 83/211, 364, 288

[56] References Cited

U.S. PATENT DOCUMENTS 3,149,520 9/1964 Fish et al. .......................... 83/288
3,834,260 9/1974 Sieurin et al. .................. 83/288 X
3,841,180 10/1974 Gütlbauer et al. ............. 83/288 X Primary Examiner—Frank T. Yost
Attorney, Agent, or Firm—Ladas & Parry

[57] ABSTRACT

Prior to the forming of bar material, without creating internal stresses, on transverse transport presses, bars are sub-divided into sections of equal volume, the end-pieces of each bar having to be discarded before further processing. To provide for the automatic and material-saving discarding of the end pieces, two light barriers are installed in the feed zone of the bars, the distance (a) between these light barriers being newly stored in a microprocessor as each bar is fed in, and this distance being converted, by calculation, to three further distances (b, c, d). By reference to these data, the microprocessor controls the discarding operation, with one, or at the most two, section lengths being discarded per bar, according to whether the interface between two successive bars is located in the central region of the section length in question, or in one of its two end-regions.

7 Claims, 5 Drawing Figures

METHOD OF AND APPARATUS FOR AUTOMATICALLY DISCARDING THE FRONT AND REAR ENDS OF BARS OF MATERIAL

DESCRIPTION

The present invention relates to a method of and apparatus for automatically discarding the front and rear ends of bars of material of finite length.

The division of bars into sections of equal length is required for the purpose of further processing on presses in which the bars of material are initially moved continuously along a straight-line conveyor track and are then fed, by intermittent forward pushing against an end-stop, to a shearing blade in whose vicinity at least the front end and the rear end of each bar of material is discarded. In such installations, at least one sensing device connected to a counter may be provided on the conveyor track of the bars of material.

Automatic transverse transport presses, which shape bar material at production rates of up to several hundred pieces per minute without creating internal stresses, are fed continuously with bars of material which are frequently heated prior to the forming operation. Shortly before the forming operation, the bars are divided into sections of equal length which have to satisfy relatively tight volume tolerances. In order to guarantee the required volume of each section, the front and rear pieces of the bars, which mostly exhibit irregularities, are discarded.

A process is described in German Patent Specification No. 1,301,690, in which a counter is brought to a readiness condition by the action of a feeler as the rear end of a bar passes, so that the cutting-off operations are counted. The counter is then reset to a second value; in the course of reaching this the severed sections of bar from the following process step are discarded. Although this process has been employed in industrial production, it nevertheless has the disadvantage that the operating personnel must, in the event of any kind of alteration in the process, for example changing to a new section length, calculate new values and apply them by resetting the equipment.

Furthermore, in this known process, more than two section lengths must in most cases be discarded for each interface between two successive bars of material.

The present invention seeks to provide a method and apparatus such that no calculations and correspondingly no resetting actions on the control unit are required on the part of the press operating personnel. In addition, the method of the invention will ensure that one or, at the most, two section lengths have to be discarded for each interface between two successive bars, or per bar, of material.

According to a first aspect of the invention, there is provided a method of automatically discarding the front and rear ends of bars of material of finite length, the bars of material being initially moved continuously along a straight-line conveyor track and then being fed, by intermittent forward pushing against an end-stop, to a shearing blade, in whose vicinity at least the front end and the rear end of each bar of material is discarded, at least one sensing device, connected to a counter, being provided in the region of the conveyor track of the bars of material and delivering a control pulse to the counter whenever the interface between two successive bars of material passes, wherein the distance (a) between two sensing devices located in the region of the conveyor track, and at least the distances (b, d) of one sensing device from a pair of feed rollers and from the shearing plane or the plane of the end-stop, are stored in a microprocessor, and the time interval, during which an end of a bar traverses the track distance (a) between the two sensing devices, is recorded, the remaining distances (b, d) also being re-expressed in terms of time intervals, and one or, at the most, two section lengths are discarded for each interface between successive bars, depending on whether the interface between bars is located in the central region of the section length in question, or in one of the two end regions, discarding being effected in the vicinity of the shearing device, by reference to the control data stored and computed in the microprocessor.

According to a second aspect of the invention, there is provided apparatus for automatically discarding the front and rear ends of bars of material, comprising: a straight-line conveyor track with continuously driven transport rollers and discharging into at least one pair of intermittently driven feed rollers; a shearing blade installed behind, in the direction of movement of the bars of material, the pair of feed rollers, and having an end-stop, located behind the shearing blade at a distance equal to the section length; two sensing devices provided in the region of the conveyor track and connected to a counter; a microprocessor arranged to store the distance (a) between the sensing devices and at least the distances (b, d) between one sensing device and the pair of feed rollers and between said one sensing device and the shearing plane or the plane of the end-stop; a device for lifting one roller of the pair of feed rollers, as a function of the distance of the bar end in question in relation to the pair of feed rollers; and a device for discarding one, or at the most, two bar section lengths, in the vicinity of the shearing device, by reference to the control data stored and computed in the microprocessor.

The method and apparatus can be applied to the forming of bars under both warm and cold conditions.

The invention will be further described by way of example with reference to the accompanying drawings, in which:

FIG. 1 schematically illustrates the progress of a bar, from the bar storage facility to the shearing station in an embodiment of the present invention;

Figure 1:
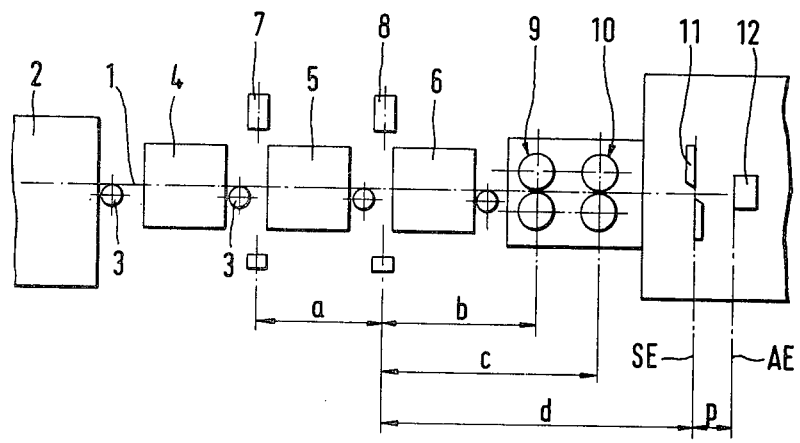

In FIG. 1 a bar 1 which is indicated by a chain-dotted line for the sake of simplicity emerges, from the left, from an automatically operating bar storage facility 2, is propelled by continuously rotating rollers 3, through a first unit 4 of the heating system and is detected by a first light barrier 7. The bar then passes through a further unit 5 of the heating system, followed by a second light barrier 8. After passing through a final unit 6 of the heating system, the bar is gripped by two pairs of feed rollers 9 and 10 and is thrust forward at an increased velocity, in an intermittent manner synchronised with the machine operating rate, onto an end-stop 12, which is located behind the shearing plane, marked SP, at a distance corresponding to the section length to be sheared off, P. At this point, the bar sections, which are to be processed further, are sheared off by the shearing blade 11, indicated schematically, and then fed to the first forming station.

In a preferred illustrative embodiment, the process according to the invention proceeds in the following manner:

Following completion of the setting-up of the machine and of the electronic equipment, and of the light barriers 7 and 8, the distances a, b, c, and d, which can be seen in FIG. 1, are measured and fed to a microprocessor as fixed values. The following individual distances are involved:

Distance a: mutual separation of the two light barriers 7 and 8,

Distance b: distance of the second light barrier 8 from the first pair of feed rollers 9, Distance c: distance of the second light barrier 8 from the second pair of feed rollers 10, and Distance d: distance of the second light barrier 8 from the shearing plane SP.

Starting production, the operator must, by pressing a button, allow the first lengths of bar to drop. When the end of the bar now passes the light barrier 7, a dark/light switch-over is produced and this signal activates a counter, which counts the number of timing pulses, up to the point in time when the end of the bar passes the second light barrier 8. Since the distances a, b, c and d are stored in the microprocessor and since the latter counts the number of timing pulses for the distance a for each newly-introduced bar, the processor computes the number of timing pulses corresponding to the distances b, c and d.

Instead of the light barriers 7 and 8, other sensors, for example mechanical sensors, or sensors reacting to the thermal radiation of the heated bars could also be used. In this application, it is important only that the sensors register the passing of the end of the bar and transmit a corresponding signal to the counter, so that the latter thereby starts counting the timing pulses.

The next bar follows the preceding bar at a constant velocity, which effectively corresponds to the average speed at which the bars are thrust forward, this velocity defining the rpm of the driven transport rollers 3 of the heating system. Due to this continuous following-up by the next bar and having regard to the intermittent thrusting forward by the feed rollers 9, 10, there is always a gap between the bars, which is effectively closed whenever the feed process restarts. Since the detection width of the light barriers 7 and 8 extends over a defined and comparatively small amount, each interface between two successive bars of material is safely registered.

Due to the interaction between the continuous forward movement and the intermittent thrusting forward, and due to other interfering effects which cannot be controlled, it is possible for undesired gaps to occur between the sequentially following bars, and these gaps must be continuously compensated for in order to ensure reliable functioning of the process to be described. The arrangement described in the following text is used for this purpose:

Should the interface between two successive bars of material be located approximately one section length in front of the first feed roller 9, the counter has thus counted the timing impulses computed in respect of the distance b (less 1 section length), and the first upper feed roller 9 will be lifted. This lifting of the feed roller is effected while the feed is stationary and the first upper feed roller then remains in the lifted condition over the period of two feed processes. While the first feed roller is in this lifted condition, a bar closing-up device, which is not shown but is located in the region of the heating system, comes into action. This means that, for example, the driven transport rollers 3, which effect the continuous feeding of the new bars, increase the transport velocity over a distance which is to be determined and can thereby close the gap which has possibly occurred between the two bars.

This closing-up operation always continues somewhat beyond the particular point in time at which the first feed roller 9 has lowered again. The lowering of this feed roller occurs immediately before the renewed feed process of the machine, that is to say, when the feed rollers are still just at rest. After the lowering of the feed roller, both the bars are thereby drawn in, synchronised with the machine speed, and most particularly without any gap. It is accordingly unnecessary with regard to the progress of the interface between the two successive bars through the rollers 10, to arrange for one or more sections to be dropped, since gaps of this type can be safely compensated for before the pairs of feed rollers are reached. Thus, bar sections have to be dropped only when the interface between successive bars falls within the region of the shearing plane SP.

Should now, for any reason, the new bar not follow directly behind the old bar, but at some separation such that the bar closing-up device cannot guarantee to close the gap, the machine is automatically switched off. This occurs at the point in time at which the end of the old bar has not yet passed the second pair of feed rollers 10. Accordingly, the old bar should still be gripped by the second pair of feed rollers, because, after any interruption in operation, the heated bars must be removed from the machine because of the cooling which will have occurred. For this purpose the drive transport rollers 3 and the feed rollers 9 and 10 are driven in reverse.

The separation at which the new bar follows the preceding bar, is determined by the light barriers 7 and/or 8. Their signals are transmitted, via the dark/light and light/dark circuit, to the microprocessor which then transmits the necessary commands to the machine.

Before the machine is switched off on account of a gap detected by the light barriers, a device (bar section holder in the shearing zone), which is still to be described, prevents the processing of bar offcuts.

So that as few bar sections as possible now have to be discarded for better economy, each revolution of the machine (corresponding to a working cycle) was subdivided into time impulses in the following manner:

Feed step, approximately $\frac{1}{3}$ of a revolution: a fixed number of steps.

The remainder of the machine revolution: the same number of steps.

Figure 2:
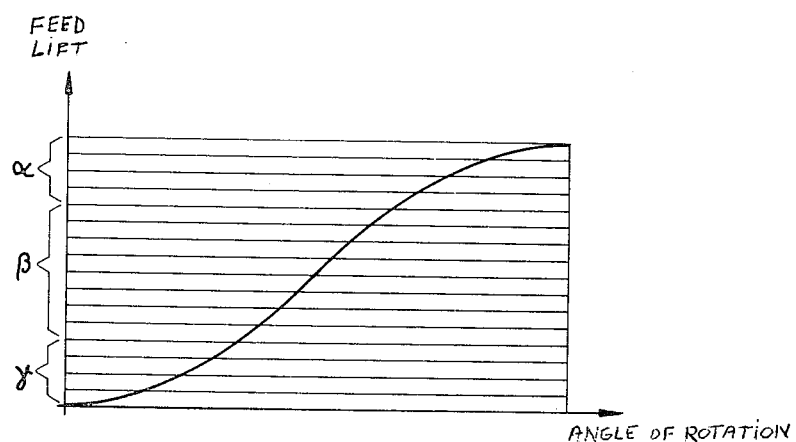
FIG. 2 is a graph showing sub-division of a bar section length.

Thus n pulses are obtained per revolution of the machine. These n pulses are counted as timing pulses per revolution. By thus sub-dividing a revolution of the machine, the section length can be sub-divided as desired, in order thereby to ensure a sufficiently accurate control procedure for dropping the sections to be discarded. The sub-division of a bar section length is shown in FIG. 2.

The described sub-division of a machine revolution into n timing pulses was made for the following reasons:

As the end of the bar passes through the light barriers 7 and 8, the angular position of the machine rotation is recorded, thereby assuring that the bar section is "measured" to a fraction of its length. Subsequent calculations are also performed to this accuracy.

Thereby the position of the interface between two successive bars is known exactly, when it reaches the shearing plane.

Figure 5:
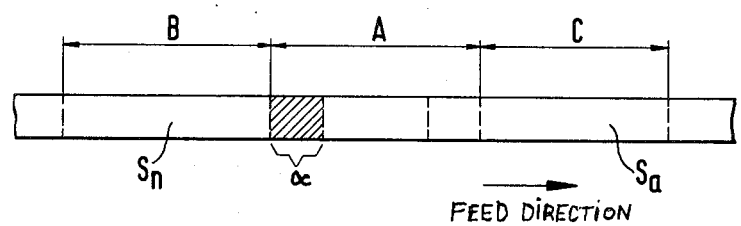
FIG. 5 shows three possibilities for the discarding of bar sections, by reference to the position of the interface between two successive bars of material at the time in question.
Figure 5:
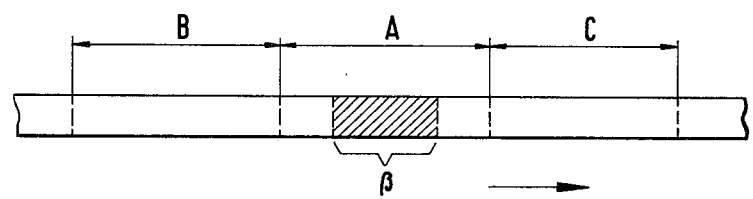
Figure 5:
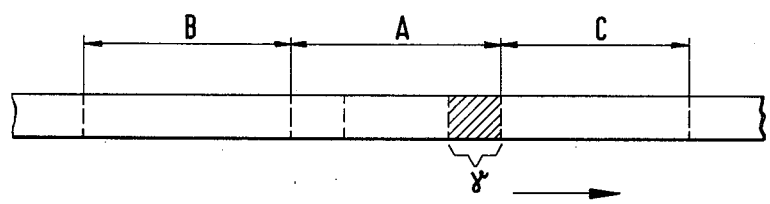

FIG. 5 illustrates this operation. Three bar sections A, B and C are shown. The interface between two successive bars is located in the region of the section A. The section B is thereby a part of the new bar Sn, whilst section C belongs to the old bar Sa.

Should the interface between the old and the new bars be located within the rear end region (seen in the feed direction) of the section A in FIG. 5, that is to say in the region $\alpha$, the section C will accordingly be processed further, whilst sections A and B are allowed to fall. B is accordingly still discarded because the interface can be present very near to section B and, thereby, accurate squareness is no longer present.

Should the interface between the old and the new bar be located within the central region of the section A (region $\beta$), as shown in the middle diagram of FIG. 5, only the section A, which includes the end of the previous bar and the beginning of the rear bar, is allowed to be discarded, while the sections C and B are processed further.

If the interface is located in the front end-region of the section A, that is within the region $\gamma$ (FIG. 5 below), the sections C and A are rejected, since the end of the bar can possess the same defects as the beginning.

This control procedure is permanently programmed into the computer. From this, it unambiguously follows that in each case only one, at most two, bar section lengths are discarded. In the case of the upper representation part of FIG. 5, two bar section lengths are involved, which extend over three separate portions to be discarded; according to the middle diagram in FIG. 5, merely one section length (2 portions) is discarded and, according to FIG. 5, bottom, two bar section lengths are also to be discarded, these lengths extending over three portions to be separated-out.

Should a light barrier, 7 or 8, fail to be activated, on account of oblique bar ends or too small a gap for example, the equipment operates on the basis of the values measured for the preceding interface between successive bars, additional sections being thrown out for safety reasons. After three successive failures to activate a light barrier, the equipment switches the machine off.

The course of the process already described is stored in the microprocessor, so that the bars which are fed in as starting material can be shorter than in the case of the known installations of similar type. The distance a+c (FIG. 1) defines the minimum length of the bars, that is to say, the bar must at least be gripped by the second pair of feed rollers, so that a measurable gap relative to the following bar, is obtained at the barrier 7.

In addition, the microprocessor is programmed in such a manner that, for the passage of each bar, it makes a new determination of the timing pulses corresponding to the distance a (FIG. 1) and converts these pulses, for the passage of each rod, in terms of the distances b, c and d. For this reason, the operative need take no action with respect to this monitoring system during production, even when it becomes known that the section length must be reset. The microprocessor continuously monitors both itself and the operation.

Figure 3:
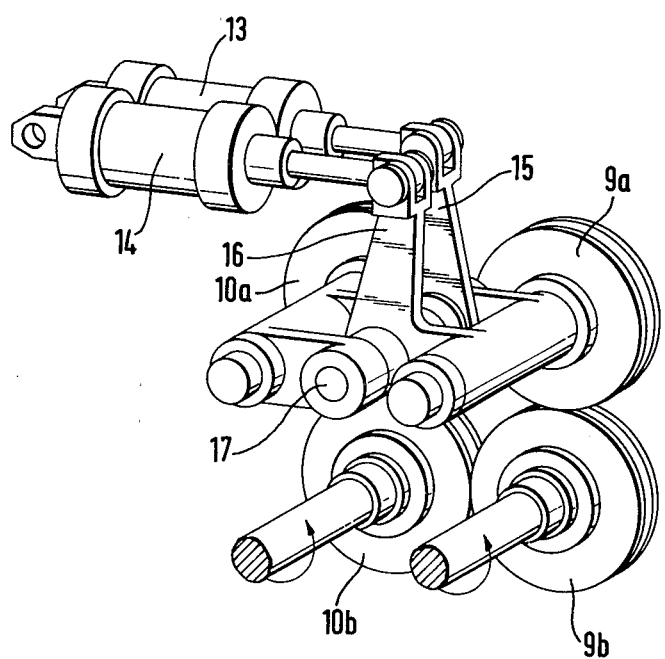
FIG. 3 is a simplified representation, in perspective, of two pairs of feed rollers, together with the associated lifting device in the apparatus of FIG. 1.

FIG. 3 shows how the upper feed rollers of the two pairs of feed rollers 9 and 10 can be lifted. The upper feed rollers, marked 9a and 10a, are not driven. They are pressed, each by means of a pneumatic cylinder 13 or 14, via bell-cranks 15 and 16, against the lower, driven feed rollers 9b and 10b. The bell-cranks 15 and 16 are mounted in a manner allowing rotation about a common fixed axis 17. The pressure, exerted on the rod, which is not shown, can be regulated by varying the air pressure in the pneumatic cylinders 13 and 14. The lower feed rollers 9b and 10b are driven in synchronisation with each other. In operation, only the first feed roller 9a is lifted on each occasion.

Figure 4:
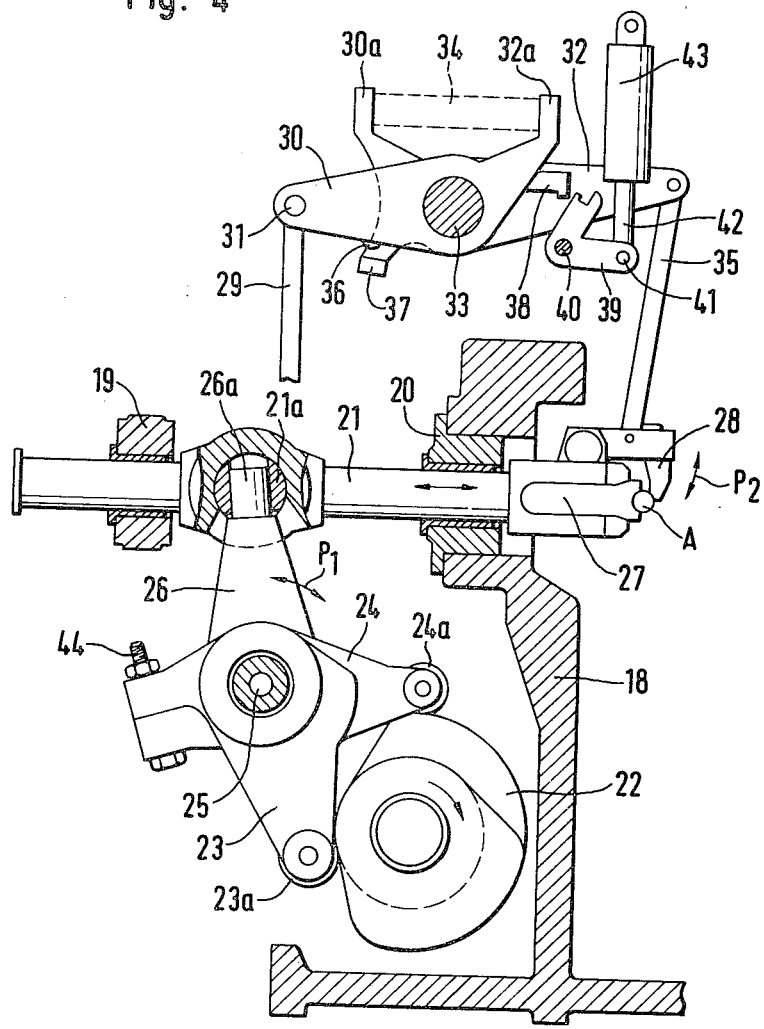
FIG. 4 shows, with the aid of a simplified sectional view, the mechanism, located in the vicinity of the shearing device, for discarding the unusable bar sections in the apparatus of FIG. 1.

The mechanism for dropping the bar sections to be discarded is shown schematically in FIG. 4. In the machine frame 18, a shearing carriage is mounted in two coaxial bearings 19 and 20 in a manner allowing reciprocating movement. This shearing carriage 21 is driven by means of a double cam 22, via a double roller crank 23 and 24. In operation, the rollers 23a and 24a of the double roller crank roll around the circumference of the double cam 22. The double roller crank 23/24 is mounted in a manner allowing rotation in the sense of the double arrow $P_1$, about a fixed axis 25. A shearing carriage crank lever 26 is connected to the roller crank 23, by means of a frangible bolt 44 and has a peg 26a which projects into a bearing 21a located on the shearing carriage 21. The shearing carriage is employed not only for the shearing operation, but at the same time is also used for feeding the sheared-off bar section to the first forming station of the press.

A shearing blade 27 of known type, is located on the front, exposed end-section of the shearing carriage 21, and serves to sever the bar section. Following completion of the feed step and before the shearing operation, a section holder 29 has the function of pressing the section, which is being formed, against the shearing blade 27, until the section is captured by the holding pin, which is not shown, of the first forming stage. Following capture, the section holder 28 is lifted and is not depressed again until the new bar section has to be gripped.

The section holder 28 is controlled via a direct-contact cam mechanism (not shown) and a connecting rod 29, this rod transmitting the rocking movement of the direct-contact cam mechanism, in synchronisation with the machine, to a spring crank 30 to which it is pivotably connected by means of a pin 31. The spring crank 30 is mounted, identically to a hub crank marked 32, in a manner allowing rocking about a common axis 33, and is designed in the form of a bell-crank. The two upward-pointing sections 30a and 32a of the two cranks are connected with each other via a tension spring 34. The hub crank 32 and the section holder 28 are coupled together by means of a coupling rod 35. The section holder 28 is thus biased under spring pressure against the section marked A.

During the reverse movement of the shearing carriage 21, the connecting rod 29 is pulled down by means of a direct-contact cam mechanism, which is not shown but is connected to the shearing carriage drive mechanism, and thus rocks the spring crank 30 about the axis 33 in the clockwise direction. The spring crank presses, by means of a nose 36 located thereon, against a driving lug 37 belonging to the hub crank 32, so that the section holder 28 is lifted when the spring crank is rocked in the abovementioned direction (arrow P₂).

In addition, an arresting nose 38 is rigidly attached to the hub crank 32, in the immediate vicinity of which a locking lever 39, designed in the form of a bell-crank, is located in a manner permitting rotation about an axis 40. The locking lever 39 is pivotably connected to the actuating rod 42 of a lifting magnet 43, via a pin 41. Should the section, lying between the shearing blade 27 and the section holder 28, be discarded, the lifting magnet 43 is energised by the microprocessor while the shearing carriage 21 is performing its reverse movement, that is, while the section holder 28 is also lifted. The lifting magnet thereby pushes the locking lever 19 below the lifted arresting nose 38 of the hub crank 32, thus preventing the section holder from descending. The following bar section is thus no longer held by the section holder 28 against the shearing blade 27 and falls out downwards. The locking lever 39 can only be unlocked when the section holder 28 is next lifted, that is to say, only when the shearing carriage 21 makes its next reverse movement.

All the control operations described, which the microprocessor transmits to the control devices of the machine, can also be activated by the operating personnel, by means of the switch located on the control desk, manual activation being necessary, for example, during setting-up of the machine.

The embodiments of the invention can be varied, by the expert, in many ways. For example, it is possible, instead of the two pairs of feed rollers 9/10, to employ only one and, instead of the four dimensions a, b, c and d, drawn in FIG. 1, to record only the dimensions a, b and d. Furthermore, instead of referring the dimensions b, c and d to the sensing device 8, they could also be referred to the sensing device 7, and, finally, it would also be possible to refer the dimension d to the plane of the end-stop, marked with EP, and not to the shearing plane SP.

The time intervals, which run while the bar traverses the distances a, b, c and d, are preferably measured by timing pulses, which are newly determined for the distance a as each bar enters and are recalculated in respect of the distances b, c and d. If appropriate, another method could also be chosen, instead of timing pulses, in order to record the time taken to traverse the distance a, for feeding to the microprocessor and for recalculation.

I claim:

1. A method of automatically discarding the front and rear ends of bars of material of finite length initially continuously moving, the bars of material along a straight-line conveyor track and then feeding, by intermittent forward pushing against an end-stop, to a shearing blade, in whose vicinity at least the front end and the rear end of each bar of material is discarded, connecting at least one sensing device provided in the region of the conveyor track of the bars of material to a counter and delivering a control pulse to the counter whenever the interface between two successive bars of material passes, wherein the distance (a) between two sensing devices located in the region of the conveyor track, and at least the distances (b, d) of one sensing device from a pair of feed rollers and from the shearing plane or the plane of the end-stop, are stored in a microprocessor and recording the time interval during which an end of a bar traverses the track distance (a) between the two sensing devices, re-expressing the remaining distances (b, d) in terms of time intervals, and discarding one or, at the most, two section lengths for each interface between successive bars, depending on whether the interface between bars is located in the central region of the section length in question, or in one of the two end regions, discarding being effected in the vicinity of the shearing device, by reference to the control data stored and computed in the microprocessor.

2. A method according to claim 1, including storing in the microprocessor the distances (b, c, d) of one sensing device from a first pair of feed rollers, from a second pair of feed rollers, and from the shearing plane, or the plane of the end-stop.

3. Apparatus for automatically discarding the front and rear ends of bars of material, comprising: a straight-line conveyor track with continuously driven transport rollers and discharging into at least one pair of intermittently driven feed rollers; a shearing blade installed behind, in the direction of movement of the bars of material, the pair of feed rollers, and having an end-stop, located behind the shearing blade at a distance equal to the section length; two sensing devices provided in the region of the conveyor track and connected to a counter; a microprocessor arranged to store the distance (a) between the sensing devices and at least the distances (b, d) between one sensing device and the pair of feed rollers and between said one sensing device and the shearing plane or the plane of the end-stop; a device for lifting one roller of the pair of feed rollers, as a function of the distance of the bar end in question in relation to the pair of feed rollers; and a device for discarding one, or at the most, two bar section lengths, in the vicinity of the shearing device, by reference to the control data stored and computed in the microprocessor.

4. Apparatus according to claim 3, wherein there are two pairs of feed rollers and at least the upper roller of the upstream pair of feed rollers is coupled, via a bell-crank, to a cylinder/piston arrangement which is connected to a pneumatic system.

5. Apparatus according to claim 3, wherein a resiliently pre-tensioned section holder is provided in the vicinity of the shearing device and is coupled, via a direct-contact cam mechanism and a rod, to the drive mechanism of a shearing carriage which is caused to reciprocate, the bar section holder being arrested, in use, subject to the control exercised by the microprocessor, in its lifted rest position, until the section lengths to be discarded have fallen off.

6. Apparatus according to claim 5, wherein the rod additionally carries two bell-cranks, which are braced against each other by means of a tension spring, the two bell-cranks, carrying elements serving as mutually interacting driving lugs, for the purpose of lifting the section holder during the reverse movement of the shearing carriage, one of these elements serving as driving lugs being located within the range of movement of the other element.

7. Apparatus according to claim 5 or 6, wherein one of the two bell-cranks carries an arresting nose, which can be arrested by a locking lever during the reverse movement of the shearing carriage, this locking lever being controlled by the microprocessor.

* * * * *